United States Patent
Hecht et al.

(10) Patent No.: US 8,898,578 B1
(45) Date of Patent: *Nov. 25, 2014

(54) CONFERENCE CALLS FOR SOCIAL STREAMS

(75) Inventors: Greg Hecht, Mountain View, CA (US); Anthony Jawad, Mountain View, CA (US); Michel Ossesia, Mountain View, CA (US); Stu Blair, Portola Valley, CA (US); Jacob Hesch, San Francisco, CA (US); Craig Walker, Diablo, CA (US); Marcus Foster, West Malling (GB); Vincent Paquet, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/246,816

(22) Filed: Sep. 27, 2011

Related U.S. Application Data

(63) Continuation of application No. 12/970,232, filed on Dec. 16, 2010.

(51) Int. Cl.
| | |
|---|---|
| *H04L 29/06* | (2006.01) |
| *H04M 3/42* | (2006.01) |
| *G06F 3/01* | (2006.01) |
| *H04M 3/56* | (2006.01) |
| *G06Q 10/10* | (2012.01) |

(52) U.S. Cl.
CPC ............... *H04M 3/56* (2013.01); *H04M 3/567* (2013.01); *G06Q 10/10* (2013.01); *H04M 2203/5063* (2013.01)
USPC ...... 715/753; 379/202.01; 709/204; 455/416; 705/319

(58) Field of Classification Search
CPC .......... H04M 3/56; H04M 2203/5063; H04M 3/567; G06Q 10/10
USPC ...................... 715/753; 379/202.01; 709/204; 455/416; 705/319
See application file for complete search history.

(56) References Cited

U.S. PATENT DOCUMENTS

| | | | | |
|---|---|---|---|---|
| 5,754,636 | A | * | 5/1998 | Bayless et al. ............. 379/142.1 |
| 6,130,938 | A | | 10/2000 | Erb |
| 6,192,119 | B1 | | 2/2001 | Wilson |

(Continued)

FOREIGN PATENT DOCUMENTS

WO WO02079984 10/2002

OTHER PUBLICATIONS

Licamele et al., Social Capital in Friendship-Event Networks, Data Mining, 2006. ICDM '06. Sixth International Conference on 2006. p. 959-964.*

(Continued)

*Primary Examiner* — Jordany Nunez
(74) *Attorney, Agent, or Firm* — Patent Law Works LLP

(57) ABSTRACT

A system and method for generating a conference call within a social network is disclosed. The participants are all members of an affinity group and they communicate with each other using different social streams. When the stream becomes too complicated, a participant transforms the social stream into a conference call so that the discussion is held in real-time. The participant that requests the conference call is designated as a moderator. The moderator controls the conference, including the members of the affinity group, through a user interface. Once the conference is established a notification can be sent to invitees and other members of the affinity group. The notification can also be published on a social network.

28 Claims, 10 Drawing Sheets

(56) References Cited

U.S. PATENT DOCUMENTS

| | | | |
|---|---|---|---|
| 6,697,478 | B1 | 2/2004 | Meldrum et al. |
| 6,754,322 | B1 | 6/2004 | Bushnell |
| 7,106,848 | B1 | 9/2006 | Barlow et al. |
| 7,366,990 | B2 | 4/2008 | Pitroda |
| 7,379,704 | B2 * | 5/2008 | Parker et al. ............... 434/350 |
| 7,555,110 | B2 | 6/2009 | Dolan et al. |
| 7,610,287 | B1 | 10/2009 | Dean et al. |
| 7,742,468 | B2 | 6/2010 | Vagelos |
| 8,166,408 | B2 * | 4/2012 | Castellucci ............... 715/758 |
| 8,233,885 | B2 * | 7/2012 | Kansal et al. ............ 455/412.1 |
| 2001/0049283 | A1 * | 12/2001 | Thomas ................... 455/426 |
| 2002/0137490 | A1 | 9/2002 | Gallant |
| 2002/0143874 | A1 | 10/2002 | Marquette et al. |
| 2004/0047461 | A1 * | 3/2004 | Weisman et al. ........ 379/202.01 |
| 2004/0258220 | A1 | 12/2004 | Levine et al. |
| 2005/0152521 | A1 | 7/2005 | Liljestrand |
| 2005/0276406 | A1 * | 12/2005 | Keohane et al. ........ 379/202.01 |
| 2006/0026288 | A1 | 2/2006 | Acharya et al. |
| 2006/0077957 | A1 | 4/2006 | Reddy et al. |
| 2006/0206604 | A1 | 9/2006 | O'Neil et al. |
| 2007/0067387 | A1 * | 3/2007 | Jain et al. ................. 709/204 |
| 2007/0127631 | A1 | 6/2007 | Difiglia |
| 2007/0171898 | A1 | 7/2007 | Salva |
| 2007/0173236 | A1 | 7/2007 | Vishwanathan et al. |
| 2007/0248077 | A1 | 10/2007 | Mahle, Jr. et al. |
| 2008/0056475 | A1 | 3/2008 | Brannick et al. |
| 2008/0192656 | A1 | 8/2008 | Vagelos |
| 2009/0044132 | A1 * | 2/2009 | Combel et al. ............. 715/753 |
| 2010/0061538 | A1 | 3/2010 | Coleman et al. |
| 2010/0216443 | A1 | 8/2010 | Jacobstein et al. |
| 2011/0059730 | A1 * | 3/2011 | Scriven et al. ............ 455/414.1 |
| 2011/0060694 | A1 * | 3/2011 | Rao et al. ................. 705/319 |
| 2011/0098156 | A1 | 4/2011 | Ng et al. |
| 2011/0270609 | A1 | 11/2011 | Jones et al. |
| 2012/0265808 | A1 | 10/2012 | Ezell et al. |
| 2013/0054690 | A1 | 2/2013 | Wei et al. |

OTHER PUBLICATIONS

Osiek et al., Does conference participation lead to increased collaboration? A quantitative investigation, Computer Supported Cooperative Work in Design, 2009. CSCWD 2009. 13th International Conference on (978-1-4244-3534-0) 2009. p. 642-647.*

Adamic et al., "A Social Network Caught in the Web," Internet Journal, First Monday, Jun. 2, 2003, pp. 1-22, vol. 8, No. 6.

Agarwal et al., "Enabling Real-Time User Interests for Next Generation Activity-Oriented Social Networks," Thesis submitted to the Indian Institute of Technology Delhi, Department of Compter Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, pp. 252-255, London, United Kingdom.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, 8 pgs, Oct. 23, 2005.

International Search Report, International Application No. PCT/US2008/005118, Sep. 30, 2008, 2 pgs.

Lennox, "Services for Internet Telephony", Columbia University, 2004, 226 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, May 13, 2011, 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Murchu et al., "Online Social and Business Networking Communities," Digital Enterprise Research Institute DERI Technical Report, National University of Ireland, Aug. 8, 2004, 22 pgs.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

Ring Central, Inc., Internet, retrieved at http://www.ringcentral.com, Apr. 19, 2007, 1 pg.

Schulzrinne et al., "The Session Initiation Protocol: Providing Advanced Telephony Services Across the Internet," Bell Labs Technical Journal., Oct.-Dec. 1998, pp. 144-160.

Singh et al., "CINEMA: Columbia InterNet Extensible Multimedia Architecture," Department of Computer Science, Columbia University, pp. 1-83, 2002.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twigger, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

* cited by examiner

CONFERENCE CALLS FOR SOCIAL STREAMS

This application is a continuation of U.S. application Ser. No. 12/970,232 filed Dec. 16, 2010 and entitled "Conference Calls for Social Streams," which is herein incorporated by reference.

BACKGROUND

The specification relates to making conference calls in a social stream, for example, a social network. In particular, the specification relates to a conferencing module that establishes a conference call for an affinity group, calls the participants and transmits notifications to the affinity group.

In social streams, such as instant messaging, email, blogs and social networks, users generate conversation threads that are organized according to time. A real-time discussion through social streams can be quite difficult, especially when there are more than two participants and they are using different types of social media to communicate. As a result, trying to organize a simple meeting, such as seeing a movie or planning a business lunch can be overly burdensome.

Some cell phones offer a feature where a user that receives a text message, email or instant message from someone who is a contact in the user's address book can call the sender. This is fine if the conversation is only between two people, but it fails to solve the problem of communicating with more than two people on more than a single medium.

SUMMARY

The specification overcomes the deficiencies and limitations of the prior art at least in part by providing a system and method for generating a conference call between people that are communicating in a social stream. The conferencing module is stored on a social network server, a third party server or a user device, such as a mobile phone. The conferencing module can determine whether an invitee's application supports the conferencing module and if the application does support the conference module, transmit a button to the invitees to allow them to automatically join the conference call.

The conferencing module is part of an application with an affinity group, such as a social network, email, a forum, instant messaging and a blog. An affinity group is a group that shares something in common. The affinity group is defined through participant actions or common usage patterns. The common usage patterns are revealed by the conferencing interface module extracting information about relationships and interests of users from a social network and the affinity group is generated based on the relationships and interests. The affinity group can be established on the fly or from an affinity group database, from which the contact information is extracted.

In one embodiment, the conferencing module includes a conferencing interface module for generating a user interface for establishing details of the conference call. The user interface includes a button for initiating the conference call. Selecting the button causes the manages calls module to create a conference bridge and add the user to the conference for video conferencing if the user wants a video conference or the conference bridge calls the user if the user wants a telephone conference. In the case of storing the conferencing module on a user device, in one embodiment the user device calls the other participants. Thus, the participants no longer have to worry about saving conference numbers and authentication codes; instead they can merely click a button and a telephone or video conference is created between the participants.

In one embodiment, the person that initiates the conference is designated the moderator. The user interface allows the moderator to control who can join a conference, define a time for each participant to join, define an affinity group, modify a length of the conference, view conference statistics, mute the conference, record the conference, evict a participant from the conference and define a budget for the conference call. Once the moderator sets the permissions, the conferencing module manages the policy of what calls are active and who is allowed to join. The conferencing module also performs the bridging to connect the participants. The conferencing module calls the moderator first and, once the moderator accepts the conference call, the conferencing module calls the other participants.

In one embodiment, a notification of the conference is published to the social network. The notification includes a varying amount of information, such as a list of participants that joined the conference, a time that each participant joined the conference, a list of invitees that the participants want to join the conference and a duration of the conference.

A notification of the conference is published in applications with affinity groups. If the notification is used to invite a participant to the conference, the conferencing module determines whether the application incorporates the conferencing software. If the application does incorporate the conferencing software, the notification includes a button that, when selected, automatically joins the participant to the conference.

A method comprising generating a thread in the application between at least two participants that are members of the affinity group, displaying a button in the application for initiating the conference call between the at least two participants, receiving a request for the conference call via the button from one of the participants, retrieving contact information for the participants and calling the participants. A computer program product comprising a computer useable medium including a computer readable program, wherein the computer readable program when executed on a computer causes the computer to execute the method steps is also described.

BRIEF DESCRIPTION OF THE DRAWINGS

The embodiments are illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
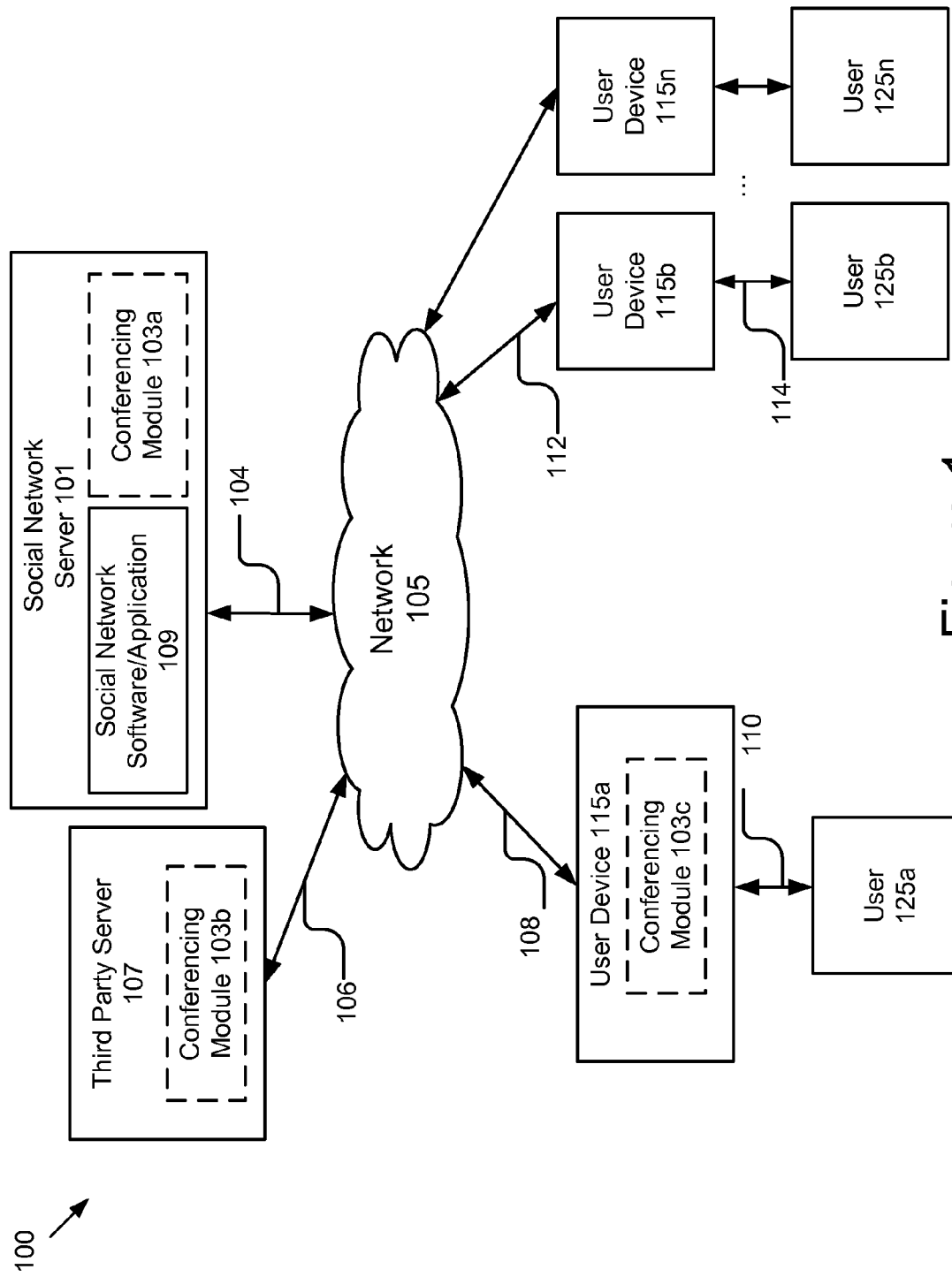
FIG. 1 is a block diagram illustrating one embodiment of a system where the conferencing module is stored on a social network server, a third party server or a user device.

A system and method for generating a conference call in a social stream is described. In the following description, for purposes of explanation, numerous specific details are set forth in order to provide a thorough understanding of the embodiments. It will be apparent, however, to one skilled in the art that the specification can be practiced without these specific details. In other instances, structures and devices are shown in block diagram form in order to avoid obscuring the embodiments. For example, one embodiment is described below with reference to user interfaces and particular hardware. However, the specification applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

An embodiment can take the form of an entirely hardware embodiment, an entirely software embodiment or an embodiment containing both hardware and software elements. A preferred embodiment is implemented in software, which includes but is not limited to firmware, resident software, microcode, etc.

Furthermore, an embodiment can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings of the specification as described herein.

System Overview

FIG. 1 illustrates a block diagram of a social network system 100 according to one embodiment. A social network is any type of social structure where the users are connected by a common feature, for example, Orkut. The common feature includes friendship, family, work, an interest, etc. The common features are provided by one or more social networking systems, such as those included in the social network system 100, including explicitly-defined relationships and relationships implied by social connections with other online users, where the relationships form a social graph. In some examples, the social graph can reflect a mapping of these users and how they are related.

A social stream includes examples of social networks, but also any application where there is a social component, such as a blog, email, a forum, etc or a predefined group, such as a business meeting or a phone call.

The illustrated embodiment of a social network system 100 includes user devices 115a, 115b, 115n that are accessed by users 125a, 125b, 125n, a social network server 101 and a third party server 107. In the illustrated embodiment, these entities are communicatively coupled via a network 105. Although only two devices are illustrated, persons of ordinary skill in the art will recognize that 115n user devices are available to 125n users.

The user devices 115a, 115b in FIG. 1 are used by way of example. While FIG. 1 illustrates two devices, the specification applies to any system architecture having at least one and easily millions of users and user devices. Furthermore, while only one network 105 is coupled to the user devices, 115a, 115b, the social network server 101 and the third party server 107, in practice any number of networks 105 can be connected to the entities.

In one embodiment, the conferencing module 103a is operable on the social network server 101, which also includes a social network software/application 109. The social network server 101 implements a server architecture according to one embodiment. The social network server 101 includes a processor (not shown). The processor can be a conventional processing device, such as a general-purpose microprocessor. The social network server 101 also includes a non-transitory computer-readable memory (not shown). The memory includes program instructions or functional units that in one embodiment implement features. Specifically, the memory includes the conferencing module 103a and the social networking software/application 109. In one embodiment, the memory also includes one or more application modules that interact with the conferencing module 103a and the social networking software/application 109 to enable a specific computer-integrated function.

In another embodiment, the conferencing module 103b is stored on a third-party server 107. In yet another embodiment, the conferencing module 103c is stored on a user device 115a. In another embodiment, the conferencing module 103 generates a user interface so that the participants can perform actions related to the conference call. The user interface can be accessed via a website or as part of the conferencing module 103. Persons of ordinary skill in the art will recognize that the conferencing module 103 can be distributed or undistributed and can be stored in any combination on the devices and servers.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

In the illustrated embodiment, the user device 115a is communicatively coupled to the network 105 via signal line 108. The user 125a interacts with the user device 115a via signal line 110. Similarly, the user device 115b interacts with the network 105 via signal line 112. The user 125b interacts with the user device 115b via signal line 114. The third party server 107 is communicatively coupled to the network 105 via signal line 106. The social network server 101 is communicatively coupled to the network 105 via signal line 104.

Application Layers

Figure 2:
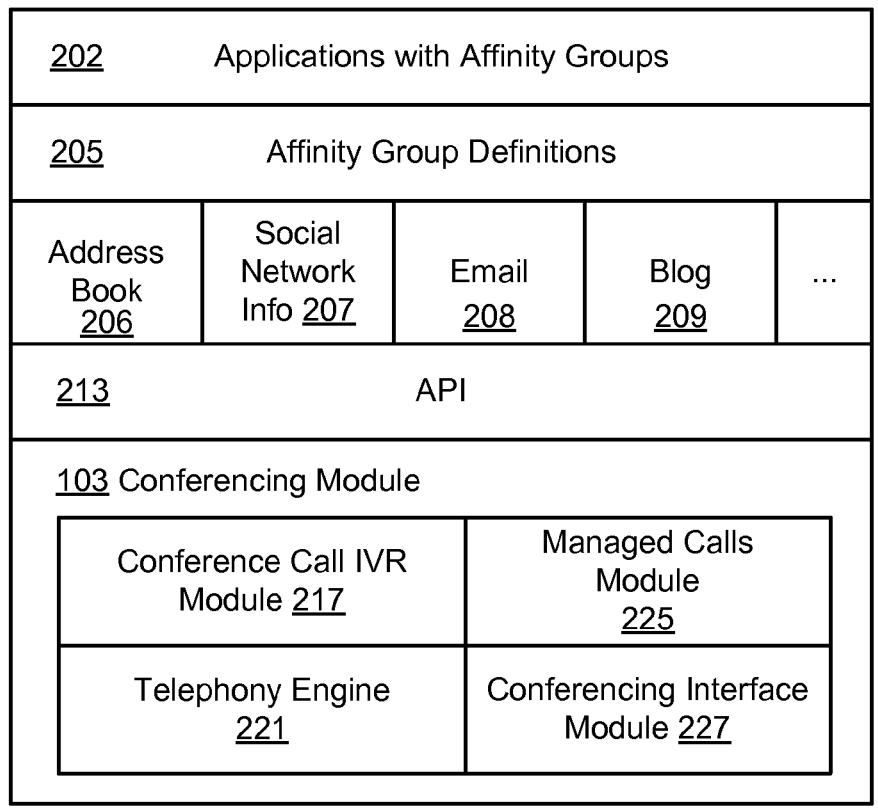
FIG. 2 is a block diagram of one embodiment of the different application layers of the conference module and social media.

FIG. 2 is a block diagram of one embodiment of the different application layers 200. The first layer includes applications with affinity groups 202. An affinity group includes any number of people that share something in common. For example, a work group is composed of employees. An affinity group is established either explicitly or is inferred. An explicit affinity group is established by defining the group, such as by establishing a college friend group that is composed of people that went to college together.

An explicit group can also be established on the fly, for example, before a user establishes a conference call. In one embodiment, the participant manually selects people (endpoints) by entering their phone numbers or selecting their names from an address book before initiating the call. In this example, the affinity group exists for the duration of the conference call.

An inferred affinity group is established by, for example, grouping all people that commented on a blog or are connected in another social stream. Persons of ordinary skill in the art will recognize that multiple groups can be formed and that there can be overlap between members of these groups.

Applications with affinity groups 202 include the social networking software/application 109, email applications, blogs, forums, instant messaging applications, etc. A simple version of an affinity group is a list of people in a user's contacts or address book. With regard to email, the affinity group is defined by the contacts list. In a social network, the affinity group can be the user's friends and can be defined even further if the social network allows for other groupings of users. In all these cases the affinity group can also be established with common usage patterns, such as two people that frequently email each other.

The affinity group definitions 205 are extracted from the applications with affinity groups 202 and the application programming interface (API) 213 transmits the information to the conferencing module 103. In FIG. 2 the different sources for contact information are illustrated as an address book 206, social network information 207, an email 208 and a blog 209 or are input manually. Persons of ordinary skill in the art will recognize that other examples of social applications are possible.

In one embodiment, the conferencing module 103 comprises a managed calls module 225, a conference call interactive voice response (IVR) module 217, a telephony engine 221 and a conferencing interface module 227. The conferencing interface module 227 generates a button in a social stream for initiating a conference call with the participants. Selecting the button either automatically creates a conference call for all participants of the social stream or it prompts the participant that selected the button to specify which members of the affinity group should be part of the conference call through a user interface.

The conferencing interface module 227 generates and displays the user interface for specifying conference details, such as a state of each participant and controls for the moderator or other participant. The moderator, through the user interface, controls who can join (e.g. by creating a whitelist of participants permitted to join the call and a blacklist of users that are blocked from joining), defines affinity groups, calls additional participants, controls what times participants can join, adds new participant endpoints, modifies the length of the conference, views conference statistics, defines a budget for the call (as required for toll calls, such as possibly international calls) and manages existing participants by, for example, muting, recording and evicting participants from the conference call. In addition, the moderator can modify certain defaults regarding the type of participants that are allowed to join. Because the conferencing module 103 is used on applications that are viewed by a large number of people, the risk of receiving spam or dealing with obnoxious people is higher. As a result, the default includes banning or temporarily preventing a participant from joining if the participant's number of requests to join conferences exceed a certain threshold.

The user interface for a participant includes, for example, basic functions like increasing the volume or muting the participant's voice, hold and hangup. In one embodiment, the user interface includes a widget for taking a poll. One example of the poll is to vote on evicting people from the conference. The poll applies in the event that there is no designated moderator to evict participants or the poll applies in addition to the moderator. Another example is to take a poll on the usefulness of the conference.

The conferencing interface module 227 works with the API 213 to manage the communications between the applications with affinity groups 202 and the managed calls module 225. Specifically, the API 213 allows the user to initiate the conference call within the application 202 with a user interface generated by the conferencing interface module 227 by transmitting the call context based on an identifier token from the application to the managed calls module 225. The managed calls module 225 then associates the call with a specific stream and identifies the endpoints to connect.

The managed calls module 225 is coupled to the conferencing interface module 227 and receives a list of participants to call from the conferencing interface module 227. The managed calls module 225 creates the conference call by calling the endpoint, which is either a terminus for connecting to a participant on the call or the call itself Thus, the endpoint is either a telephone number as defined by the E.164 standard, a session initiation protocol (SIP) address for a Voice over Internet Protocol (VoIP) call or another mechanism for establishing video conferencing. The managed calls module 225 ends the call when the moderator ends the phone call or, if no moderator is designated, by a default such as a maximum duration that is reached or when required participants leave the conference call.

During the conference call, the managed calls module 225 holds the state of the current call including who is connected, the duration and cost per leg and the operations of mixing audio from each leg and playing to the other legs. During the conference call, the managed calls module 225 is managed in memory on a single server instance. Multiple managed calls are load-balanced across multiple server instances. In one embodiment, the managed calls module 225 records the conference so that the participants can access it in the future.

The IVR module 217 and the telephony engine 221 are coupled to the managed calls module 225. The IVR module 217 manages the call session, which represents the call state. The telephony engine 221 manages the voice traffic, for example, by controlling access to individuals and groups of participants. Access is established by defaults or according to the moderator and the telephony engine 221 controls when individuals can dial into certain calls at certain times.

Figure 3:
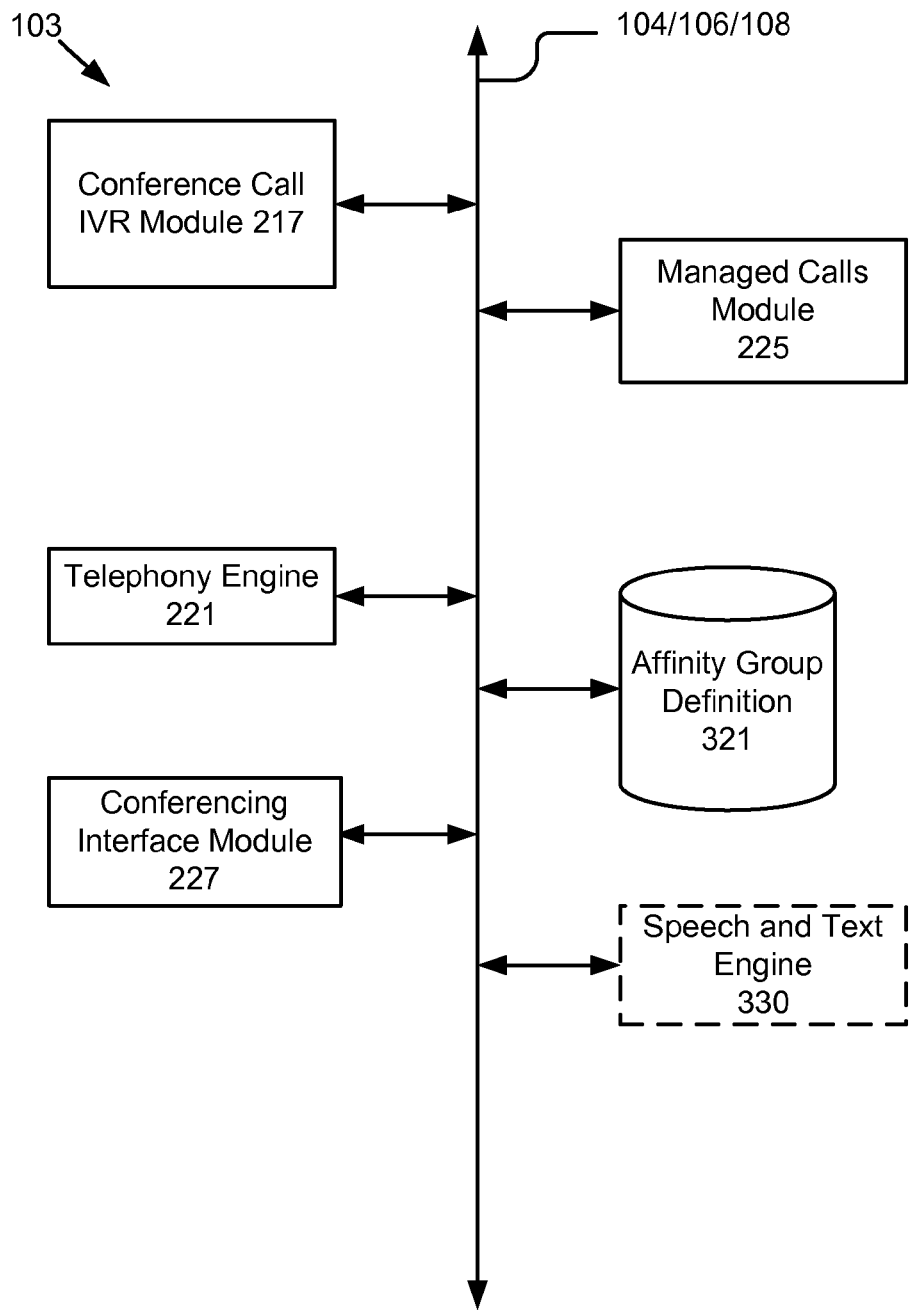
FIG. 3 is a block diagram of another embodiment of the conferencing module 103.

FIG. 3 is a block diagram of another embodiment of the conferencing module 103. In this embodiment, the conferencing module 103 comprises a conference call IVR module 217, a managed calls module 225, a telephony engine 221, an affinity group definition database 321, a conferencing interface module 227 and a speech and text engine 330.

In this embodiment, the affinity group definition database 321 is coupled to the conferencing interface module 227 and includes information for contacting members of the affinity group. Thus, instead of requesting the conference information from an application with an affinity group 202 each time a conference call is created, the contact information is stored as part of the conferencing module 103. The contact information includes phone numbers and user IDs for contacting participants using VoIP, email or instant messaging. This information is derived from contacts, address books, information provided to website forums, etc. In one embodiment, the contact number includes a number associated with Google Voice, which is configured to route any call received at that phone number to any other phone associated with the Google Voice phone number.

In one embodiment, the conferencing interface module 227 is software including routines for extracting the contact information from the participants' other applications and for transmitting the information to the affinity group definition database 321 for storage. For example, the conferencing interface module 227 extracts all Microsoft Outlook contacts. The conferencing interface module 227 generates a user interface that asks the participant for permission before performing the extracting so that privacy is maintained. In another embodiment, the conferencing interface module 227 user interface requests that the user provide a name and password for different applications, such as email, so that the conferencing interface module 227 can log into the application and extract the contacts.

In this example, the conferencing interface module 227 generates a button in a social stream. The moderator selects the button from a user device 115a to activate a conference call. The signal is transmitted to the conference call IVR module 217, which retrieves the contact information from the affinity group definition database 321 for the participants and initiates the conference call. The telephony engine 221 then manages the actual voice traffic and the managed calls module 225 holds the state of the current calls.

The speech and text engine 330 is coupled to the managed calls module 225 and is an optional engine that retrieves the voice information from the managed calls module 225 and translates speech to text so that the participants can have a transcript of the conference. The speech and text engine 330 also translates text to speech and transmits the speech to the conference so that participants can join in the conference using a social stream, such as instant messaging at times when they are unable to participate in person.

Example

Establishing a Conference Call from a Social Stream

Figure 4A:
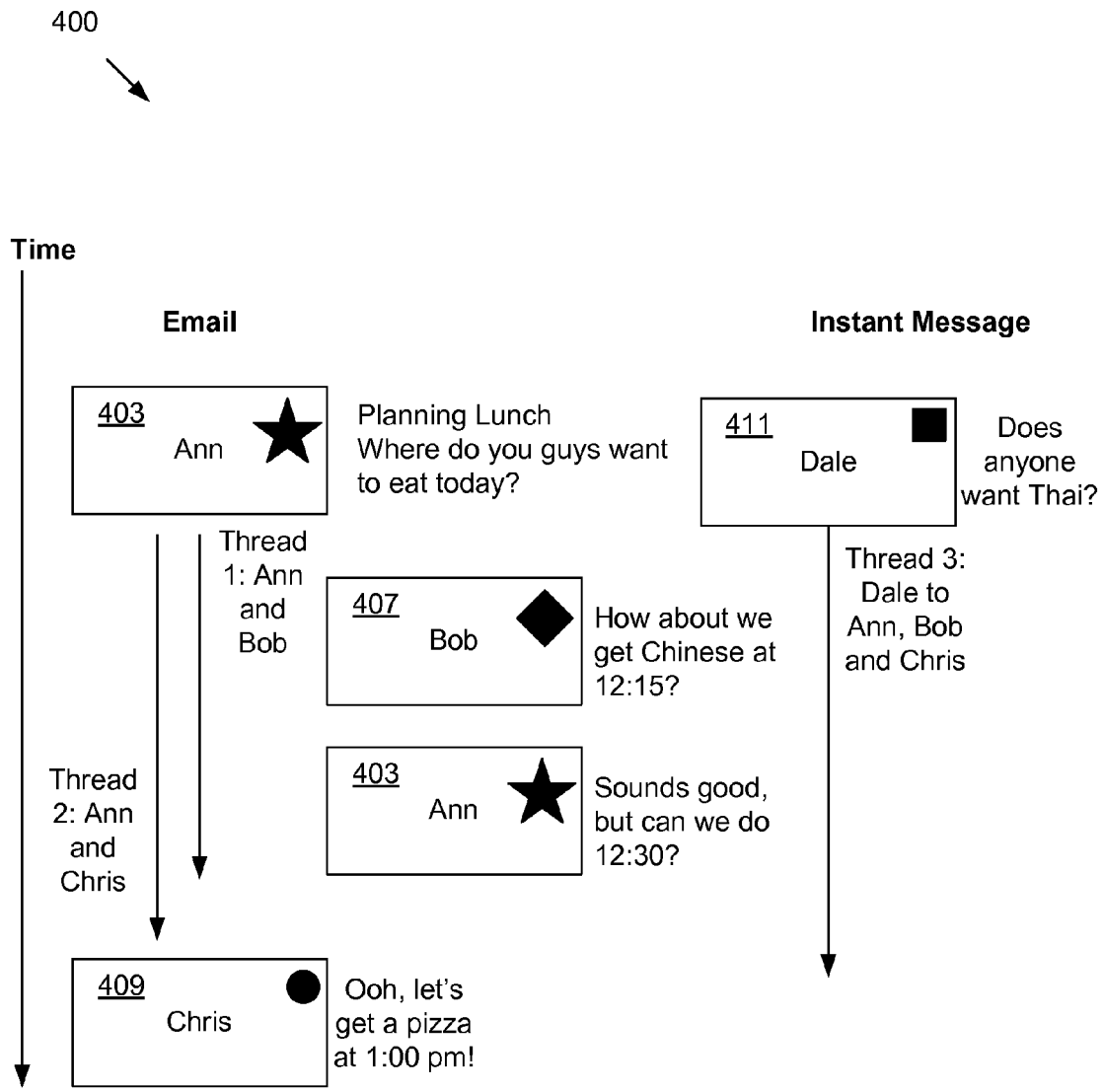
FIG. 4A is a graphical representation of one embodiment of the timeline that occurs during a social networking thread.

FIG. 4A is a graphical representation 400 of the timeline that occurs during a social networking thread. Time is defined by the vertical axis. The social stream in this example involves two different mediums: email and instant messaging. The affinity group is defined as Ann 403, Bob 407, Chris 409 and Dale 411. Ann 403 begins the social stream thread 1 by emailing Bob 407, Chris 209 and Dale 411: "Planning Lunch. Where do you guys want to eat today?" Bob 407 responds "How about we get Chinese at 12:15?" Ann 403 responds: "Sounds good, but can we do 12:30?" Thread 2 is established when Chris 209 emails Ann "Ooh, let's get a pizza at 1:00 pm!"

About the same time that Ann emails everyone, Dale 411 begins a third thread by instant messaging Ann 403, Bob 407 and Chris 409: "Does anyone want Thai?" As a result, there are three different threads using two different types of social mediums for four people trying to coordinate lunch.

Figure 4B:
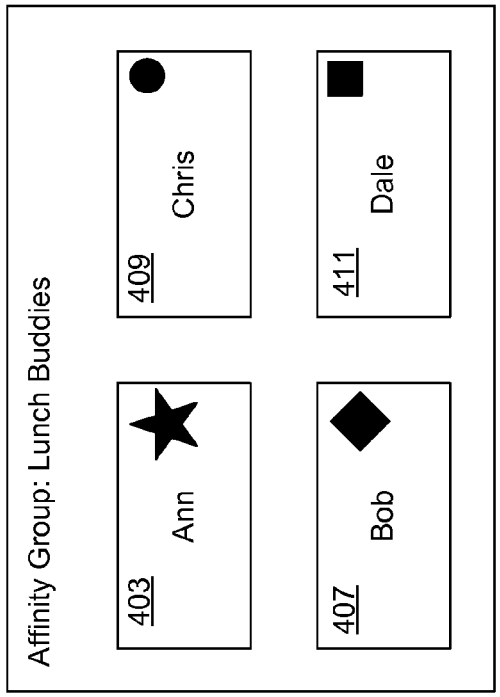
FIG. 4B is a graphical representation of one embodiment of an affinity group.

FIG. 4B is a graphical representation 401 of an affinity group. In this case, the affinity group is defined as lunch buddies and includes Ann 403, Bob 407, Chris 409 and Dale 411.

Figure 4C:
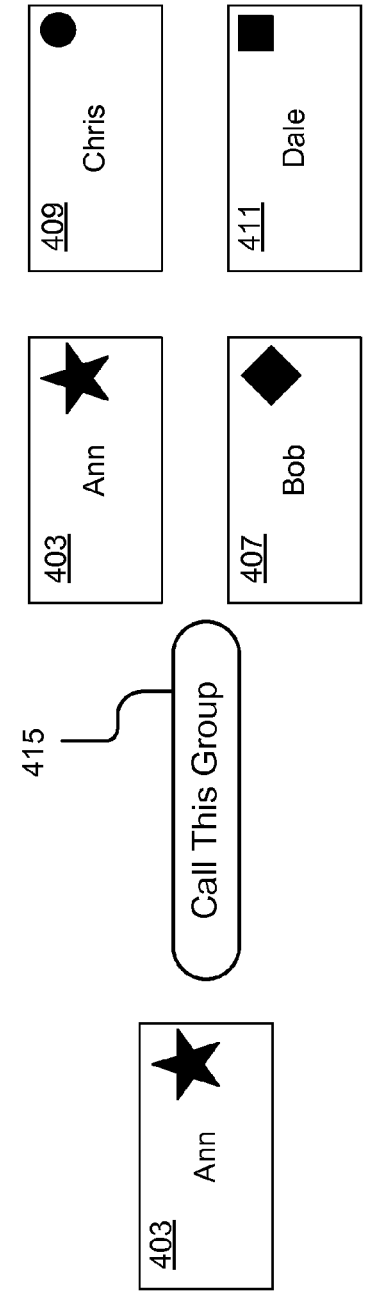
FIG. 4C is a graphical representation of one embodiment for initiating a call.

FIG. 4C is a graphical representation 402 of initiating a call. In one embodiment, the conferencing module 103 generates a button 415 that states "call this group" for initiating a conference call. The button 415 appears in a social networking application, such as Facebook or a third party server 107, such as email or it is installed as an application on a user device 115a. When Ann 403 selects the button 415, the conferencing module 103 identifies the affinity group and calls all the members.

In one embodiment, the conferencing module 103 calls Ann 403 or contacts a SIP address for a VoIP call first. When she picks up the phone or acknowledges that a VoIP call has been established, the conferencing module 103 designates Ann 403 as the moderator. In one embodiment, the moderator is designated as the person that initiates the conference call. In another embodiment, the moderator is designated by another means, such as selecting a different participant from the affinity group as the moderator each time. In yet another embodiment, the moderator can be changed during the conference, for example, if the initial moderator has to leave the call.

The moderator assigned conditions for the conference call, such as being able to specify who is a member of the affinity group, whether new people can join, what times people can join, etc. The moderator is also able to evict people from the conference call and ban them from joining altogether. If the call is a toll call, the moderator also provides billing information in case fees are incurred. Lastly, a moderator is designated because it allows the conferencing module 103 to easily define an end to the call. When the moderator ends the call, the conference call ends and all participants are disconnected.

Next, the conferencing module 103 calls the endpoints: Bob 407, Chris 409 and Dale 411 and the conference call is established. While the conference call is occurring, other applications can be used to supplement the conversation. For example, in one embodiment the conferencing module 103 includes a speech to text engine for generating a transcript of the conference or allowing participants to communicate via instant messaging.

Figure 5A:
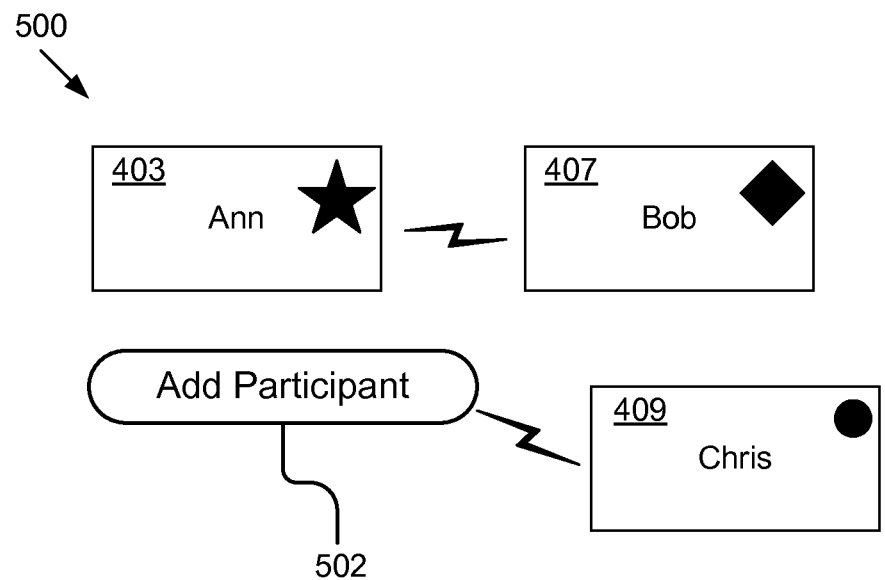
FIGS. 5A and 5B are graphical representations of one embodiment of adding a participant.
Figure 5B:
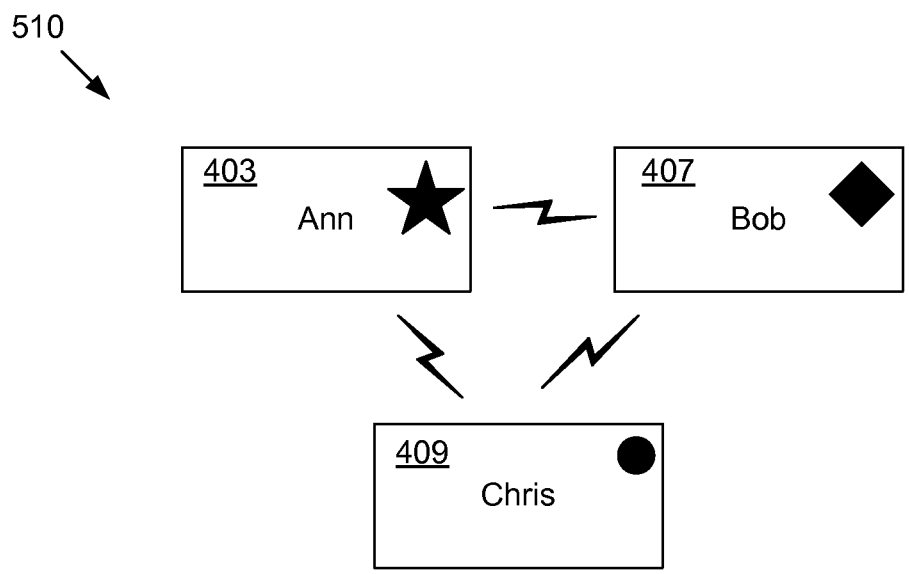

FIGS. 5A and B are graphical representations 500, 510 of an example of how to add a participant. In this example, only Ann 403 and Bob 407 are conducting a conference call. This could be because Chris 409 failed to answer the call when Ann 403 initiated the conference in FIG. 4C. The conferencing module 103 provides a button 502 for adding a participant Ann 403 selects the button 502 for adding a participant and selects another member of the affinity group: Chris 409. The conferencing module 103 rings Chris's 409 phone and Chris 409 joins the conference. FIG. 5B illustrates a graphical representation 510 of how the conference looks once Chris 409 joins.

Publishing Notifications about a Conference Call

Figure 6A:
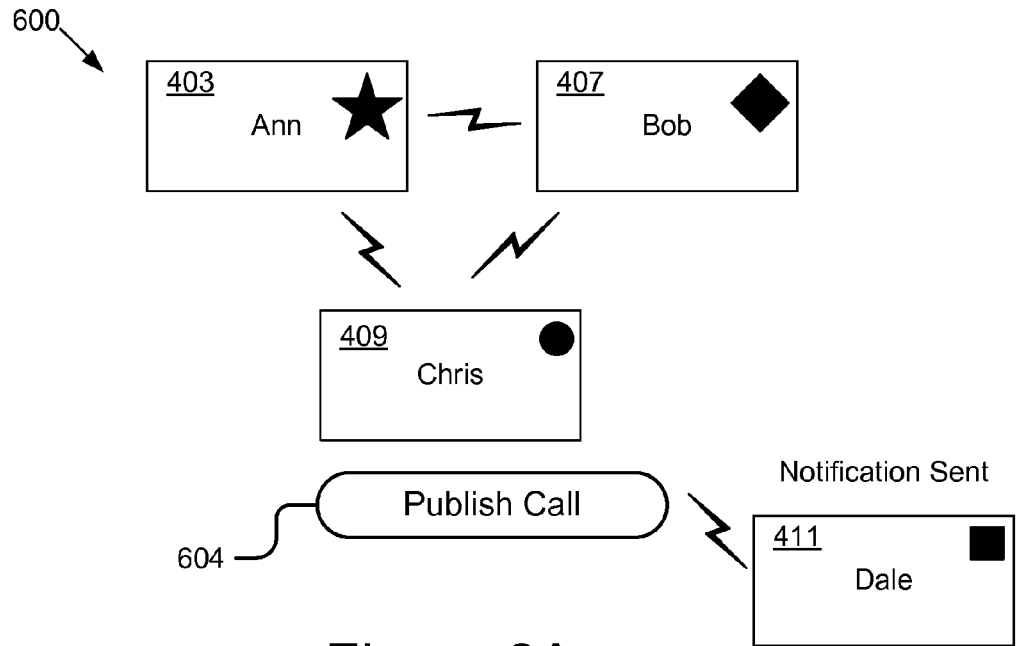
FIG. 6A is a graphical representation of a user interface for publishing a notification about the conference call.

FIG. 6A is a graphical representation 600 of publishing a notification about the conference call. In this example Ann 403, Bob 407 and Chris 409 are in a conference call. The establishment of the conference call is published. In one embodiment, the conferencing module 103 includes a button 604 for publishing a notification of the call. The notification can take many forms. For example, an email is sent out to all members of the affinity group or the notification is displayed as an instant message presence indicator. In this example, the moderator can block certain people, even within the affinity group, from receiving the notification and from obtaining access to the conference call phone number. In another embodiment, the notification is published on a social network. To prevent spammers from having access to the conference information, the notification can be restricted to certain groups of people. In FIG. 6A, the notification is sent directly to Dale 411.

The information contained in the notification takes many forms. In one embodiment the notification includes an announcement that a conference call has started. More details can be included such as the people that are in the conference call ("Ann is now on a call with Chris and Bob."). The list of people includes a person's full name (Ann Smith) or less identifying information (Ann S) The notification can also contain the subject matter of the conference call ("In Re: Lunch. Ann, Chris and Bob are on a call."). In another embodiment, the notification also includes a request for other members of the affinity group to join ("Ann, Chris and Bob are on a conference call and are waiting for Dale to join."). The moderator may opt in/out of publishing notifications to prevent the participants' privacy from being compromised.

Figure 6B:
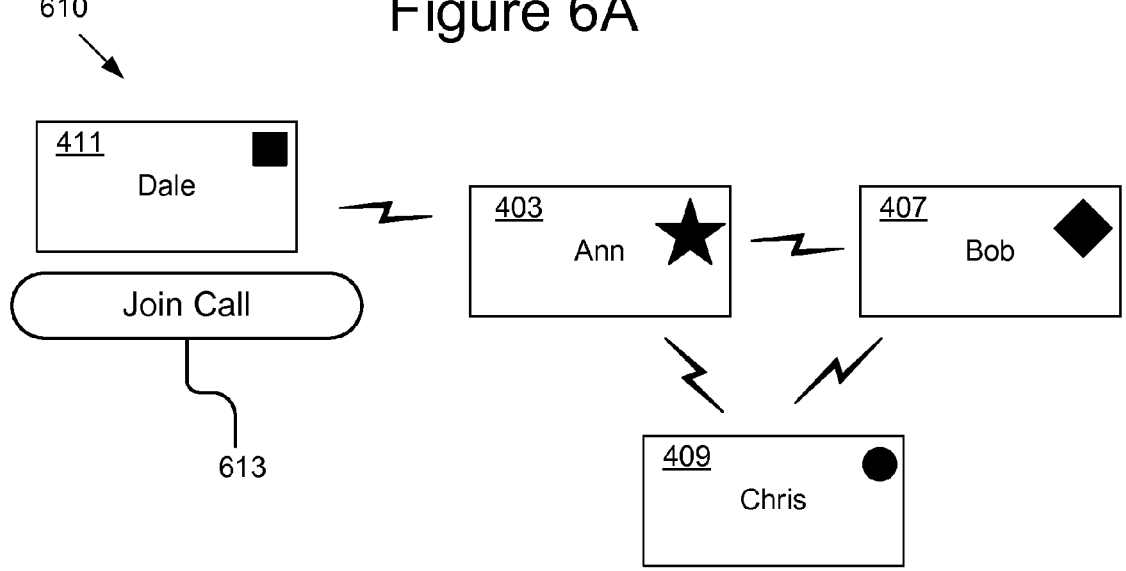
FIG. 6B is a graphical representation of a user interface for adding a participant to a pre-existing conference call.

FIG. 6B is a graphical representation 610 of adding a participant to a pre-existing conference call. Once Dale 411 receives the notification of the conference call, he decides to join. In one embodiment, the notification includes a button 613 for joining the call. The button can appear in an email or as an option associated with a notification in a social network. Selecting this button will automatically initiate a VoIP call or call Dale's 411 telephone number. If the button is displayed on an application or a device that is not compatible with the conferencing module 103, in one embodiment, the button displays the conference phone number for Dale 411 to direct dial and a passcode.

In one embodiment, the conference call is designed for a broad audience to discuss a particular topic. The topic could be a business application, such as a quarterly earnings report, or something of a more social nature such as a weekly discussion about the benefits of owning cats. In one embodiment, a notification is transmitted to all members of the earnings report affinity group or the "I like cats" affinity group. Thus, one example of the notification is: "Join us at 1-3 pm PST on Mondays for a discussion about cats. This week's topic is 'Indoor vs. Outdoor Cats: Why Having Outdoor Cats Is Bad for the Environment.'" In another embodiment, the conference call is always open and people can join according to their own availability. If the topic is general, such as all things relating to cats, it is easier for people to join and chat at random times.

The format of the conference also varies. In one embodiment of the business application, the conference call includes two segments: the first is a lecture and then the second is a question and answer session. In this example, the first segment only allows the person chairing the conference to speak. Because the second segment is a question and answer segment, the communications are bi-directional.

Methods

Figure 7:
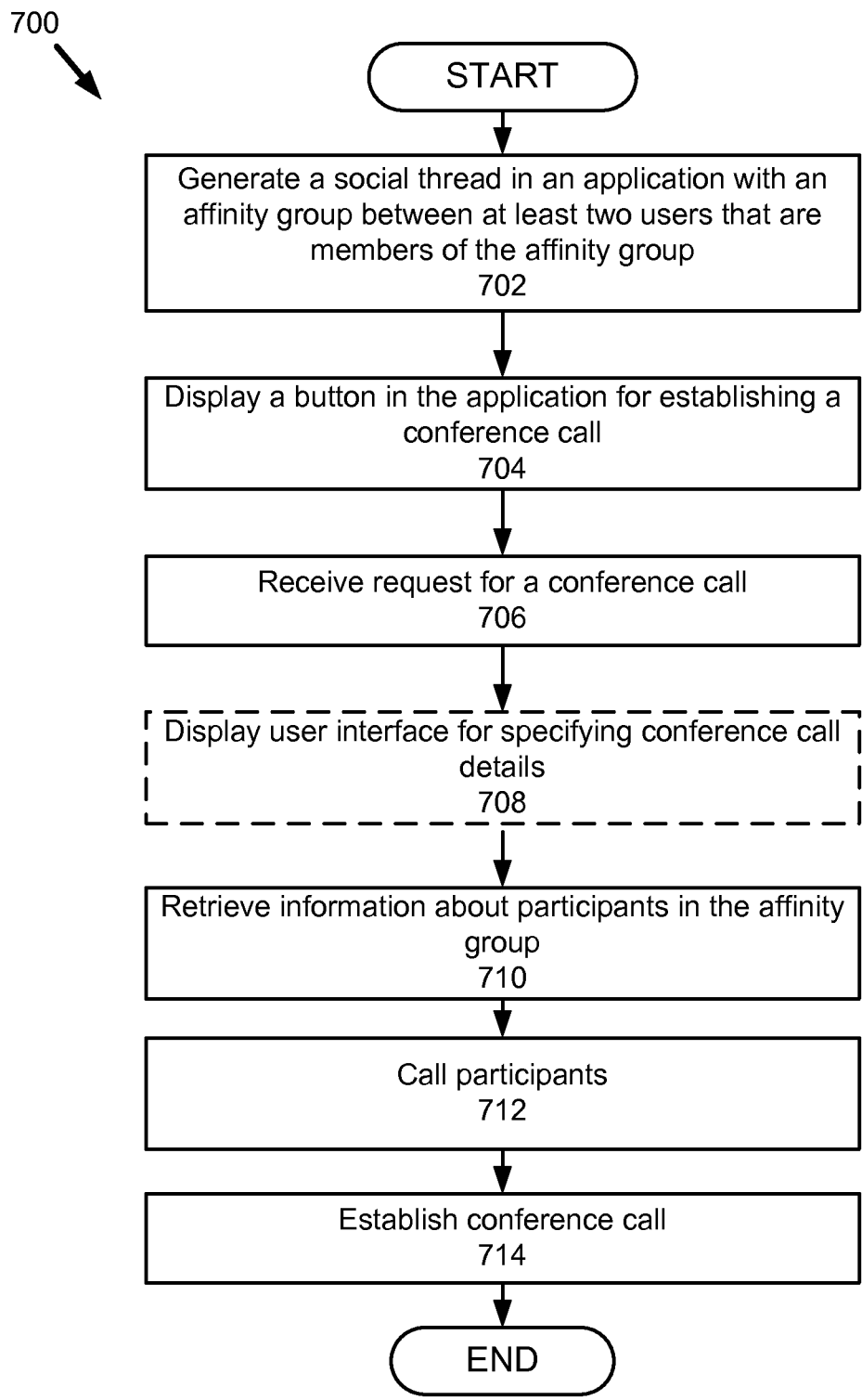
FIG. 7 is a flow diagram illustrating high-level steps for establishing a conference call.
Figure 8A:
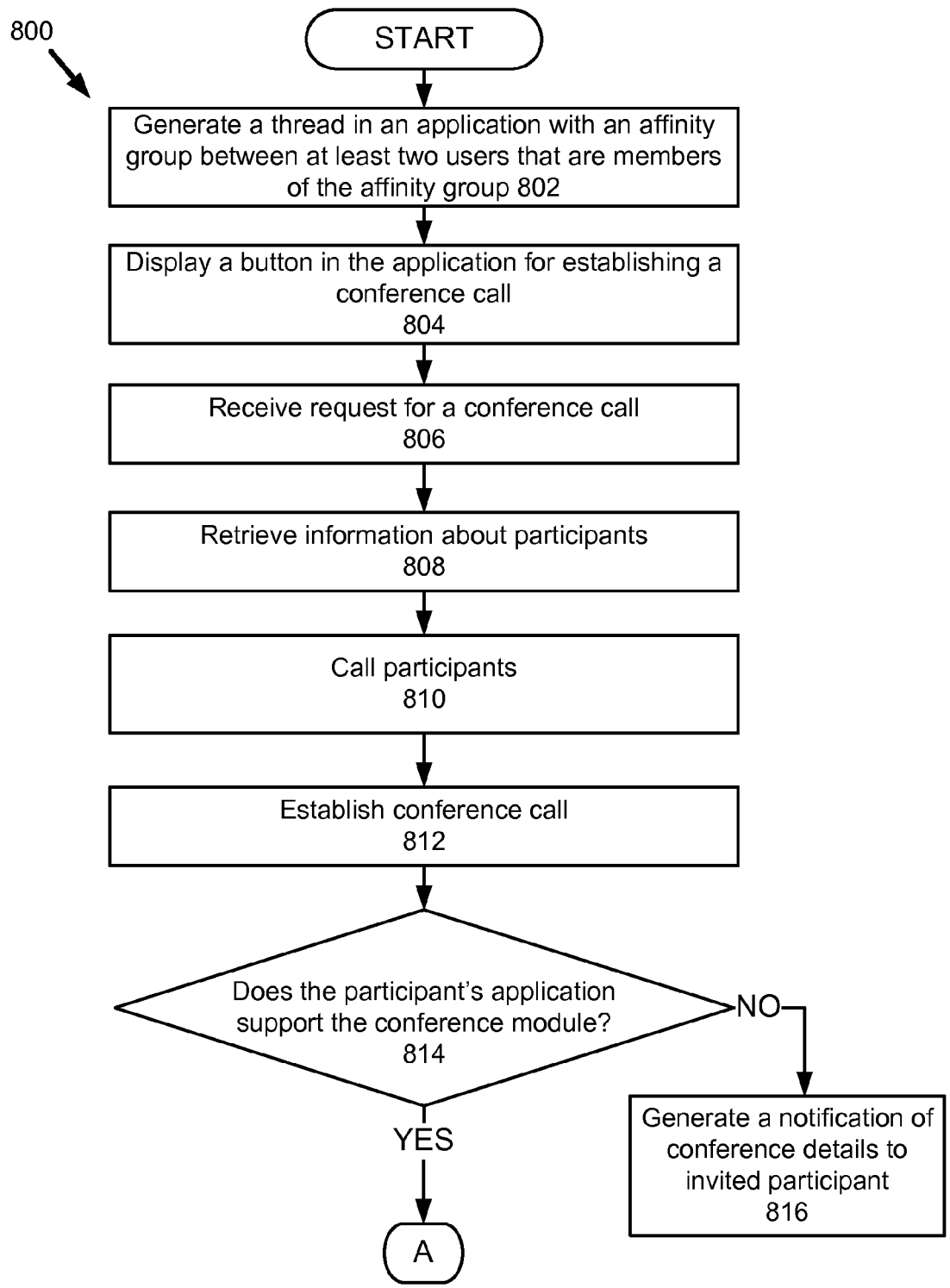
FIG. 8 is a flow diagram illustrating more detailed steps for establishing a conference call.
Figure 8B:
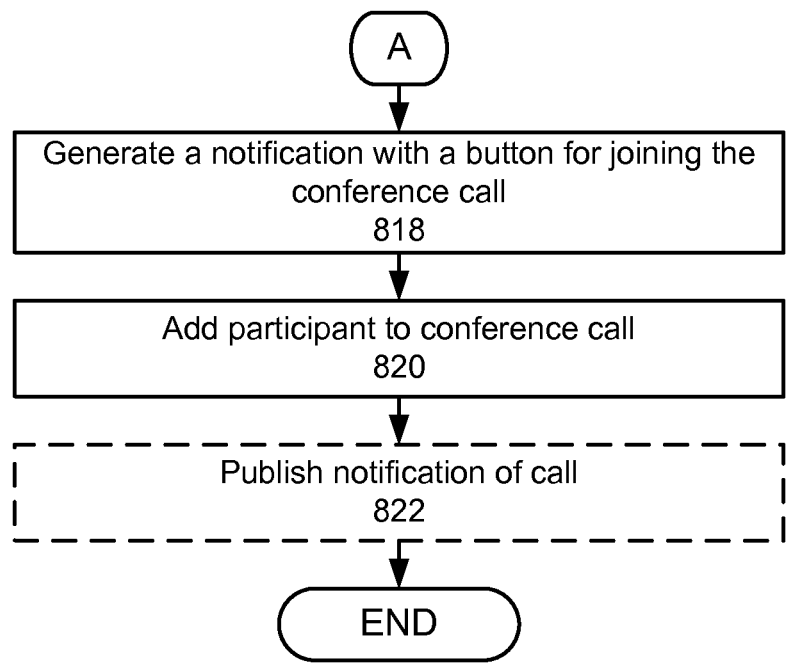

Referring now to FIGS. 7 and 8, various embodiments of the method will be described. FIG. 7 is a flow diagram illustrating high-level steps for establishing a conference call. In one embodiment, an application with an affinity group 202 generates 702 a social thread with at least two users that are members of the affinity group. The conferencing interface module 227 generates and displays 704 a button in the application for establishing a conference call. The conferencing interface module 227 receives 706 a request for a conference call. In one embodiment, the conferencing interface module 227 displays 708 a user interface for specifying conference call details. The moderator selects participants from the user interface and provides limitations on the conference call, such as duration, the time during which participants can join, etc.

In response to the request, the conference call IVR 217 retrieves 710 information about the participants in the affinity group from the affinity group definitions database 321. The conference call IVR 217 then calls 712 the participants. In one embodiment, the conference call IVR 217 calls the moderator first and then calls the other participants. Once at least two people have answered the call, the conference call IVR 217 establishes 714 the conference call.

FIGS. 8A and B are a flow diagram illustrating more detailed steps for establishing a conference call. In one embodiment, an application with an affinity group 202 generates 802 a thread with at least two users that are members of the affinity group. The conferencing interface module 227 generates and displays 804 a button in the application for establishing a conference call. The moderator selects participants from the user interface and provides limitations on the conference call, such as duration, the time during which participants can join, etc. The conferencing interface module 227 receives 806 a request for a conference call. In response to the request, the conference call IVR 217 retrieves 808 information about the participants in the affinity group from the affinity group definitions database 321. The conference call IVR 217 then calls 810 the participants.

The conferencing interface module 227 generates an invitation to join the conference call. The invitation comes in two different forms, depending upon the capabilities of the application that is used to view the invitation. Thus, the conferencing interface module 227 determines 814 whether the participant's application supports the conference module 103. For example, if the notification is being published within a social network, the social network needs to allow the conferencing interface module 227 to include sufficient functionality in the notification to automatically connect the user to the conference call. Similarly, if the notification is being sent via email, the email program needs to support a button within the email that connects the user to a VoIP call.

If the participant's application does not support the conference module 103, the conferencing interface module 227 generates 816 a notification of conference details to the invited participant. The notification includes information for connecting to the conference call, such as a telephone number and a passcode. If the participant's application does support the conference module 103, the conferencing interface module 227 generates 818 a notification with a button for joining the conference call. Once the invited participant selects the button, the conference call IVR 217 adds 820 the participant to the conference call.

In one embodiment, the conferencing interface module 227 publishes 822 a notification of the call. The notification is published on a social networking site or other application with an affinity group. The notification can be very detailed and include the list of participants or the notification includes less information, such as only a statement that the participant is in a conference. In one embodiment, the publication is displayed on an instant messaging application as a status update.

The foregoing description of the embodiments has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the embodiments are in no way limited to implementation in any specific programming language, or for any specific operating system or environment. Accordingly, the disclosure of the embodiments is intended to be illustrative, but not limiting, of the scope of the embodiments, which is set forth in the following claims.

What is claimed is:

1. A computer-implemented method of initiating a conference call, the method comprising:

identifying, using one or more computers, a first thread in a first application having an affinity group between at least two participants that are members of the affinity group;

identifying, using the one or more computers, a second thread in a second application having the affinity group between the at least two participants that are members of the affinity group, wherein the first thread and the second thread include one or more discussions between the at least two participants and a first medium of communication for the first thread that is different from a second medium of communication for the second thread;

responsive to identifying the first thread, providing for display of a first button in the first application for initiating the conference call between the at least two participants;

responsive to identifying the second thread, providing for display of a second button in the second application for initiating the conference call between the at least two participants;

receiving, via the first button, a request from one of the participants to join the conference call, wherein the request includes a list of participants to join the conference call that includes the at least two participants;

retrieving, the one or more computers, contact information for the list of participants;

establishing, using the one or more computers, the conference call for later joining by one or more of the list of participants;

determining whether for each participant from the list of participants, an application for the participant supports a conference module;

responsive to the application supporting the conference module, allowing the invitee to automatically join the conference call; and
responsive to the determination that the conference module is unsupported, generating a notification of the conference details to the participant.

2. The method of claim 1, wherein the participant that requests the conference call is designated as a moderator and wherein establishing the conference call further comprises:
calling the moderator; and
responsive to the moderator accepting the conference call, calling the other participants.

3. The method of claim 1, wherein a user interface allows a moderator to perform at least one of the following actions: control who can join the conference call, define a time for each participant to join, define the affinity group, modify a length of the conference call, view conference call statistics, mute the conference call, record the conference call, evict a participant from the conference call and define a budget for the conference call.

4. The method of claim 1, wherein the first application is at least one of a social networking application, an email application, a blog, a forum and an instant messaging application.

5. The method of claim 1, further comprising publishing a notification of the conference call.

6. The method of claim 5, wherein the notification includes at least one of a list of participants that joined the conference call, a time that each participant joined the conference call, a list of invitees that the participants want to join the conference call and a duration of the conference call.

7. The method of claim 1, wherein the conference call is conducted as at least one of a telephone conference and a video conference.

8. The method of claim 1, wherein the affinity group is established on the fly.

9. The method of claim 1, further comprising:
extracting the contact information about the members of the affinity group; and
storing the contact information in an affinity group database.

10. The method of claim 1, wherein the affinity group is defined as a group that shares something in common.

11. The method of claim 1, wherein the affinity group is defined from at least one of an action by a participant and from common usage patterns.

12. The method of claim 1, further comprising:
extracting information about relationships and interests of users from a social network; and
generating the affinity group based on the relationships and interests.

13. The method of claim 1, further comprising providing a user interface for establishing details of the conference call.

14. A system for initiating a conference call comprising:
a first application stored on a non-transitory memory, the first application having an affinity group and identifying a first thread between at least two participants that are members of the affinity group;
a second application having the affinity group and identifying a second thread between the at least two participants that are members of the affinity group, wherein the first thread and the second thread include one or more discussions between the at least two participants and a first medium of communication for the first thread is different from a second medium of communication for the second thread; and
a conference module comprising:
a conferencing interface module for:
responsive to identifying the first thread, generating a first button that is provided for display in the first application, responsive to identifying the second thread, generating a second button that is provided for display in the second application, the first button transmitting a request for establishing the conference call to a managed calls module, wherein the request includes a list of participants to join the conference call that includes the at least two participants;
retrieving contact information for the list of participants; and
determining whether for each participant from the list of participants application for the participant supports the conference module, responsive to the application supporting the conference module, allowing only the participant whose application supports the conference call to automatically join the conference call and responsive to determining that the conference module is unsupported, generating a notification of conference details to the participant; and
the managed calls module coupled to the conferencing interface module for receiving the contact information for the participants of the conference call, the managed calls module for establishing the conference call for later joining by one or more of the list of participants.

15. The system of claim 14, wherein the participant that requests the conference call is designated as a moderator and wherein establishing the conference call further comprises calling the moderator and responsive to the moderator accepting the conference call, calling the other participants.

16. The system of claim 14, wherein a user interface allows a moderator to perform at least one of the following actions: control who can join the conference call, define a time for each participant to join, define the affinity group, modify a length of the conference call, view conference call statistics, mute the conference call, record the conference call, evict a participant from the conference call and define a budget for the conference call.

17. The system of claim 14, wherein the first application is at least one of a social networking application, an email application, a blog, a forum and an instant messaging application.

18. The system of claim 14, wherein the conferencing interface module publishes a notification of the conference call.

19. The system of claim 18, wherein the notification includes at least one of a list of participants that joined the conference call, a time that each participant joined the conference call, a list of invitees that the participants want to join the conference call and a duration of the conference call.

20. The system of claim 14, wherein the conference call is conducted as at least one of a telephone conference and a video conference.

21. The system of claim 14, wherein the affinity group is established on the fly.

22. The system of claim 14, wherein the conferencing interface module extracts the contact information about the members of the affinity group and stores the contact information in an affinity group database.

23. The system of claim 14, wherein the affinity group is defined as a group that shares something in common.

24. The system of claim 14, wherein the affinity group is defined from at least one of an action by a participant and from common usage patterns.

25. The system of claim 14, wherein the conferencing interface module extracts information about relationships and interests of users from a social network and generates the affinity group based on the relationships and interests.

26. The system of claim 14, wherein the conferencing interface module provides a user interface for establishing details of the conference call.

27. A computer program product comprising a non-transitory computer useable medium including a computer readable program, wherein the computer readable program when executed on a computer causes the computer to perform steps comprising:
   identifying a first thread in a first application having an affinity group between at least two participants that are members of the affinity group;
   identifying a second thread in a second application having the affinity group between the at least two participants that are members of the affinity group, wherein the first thread and the second thread include one or more discussions between the at least two participants and a first medium of communication for the first thread is different from a second medium of communication for the second thread;
   responsive to identifying the first thread, providing for display of a first button in the first application for initiating a conference call between the at least two participants;
   responsive to identifying the second thread, providing for display of a second button in the second application for initiating the conference call between the at least two participants;
   receiving, via the first button, a request, from one of the participants, to join the conference call, wherein the request includes a list of participants to join the conference call that includes the at least two participants;
   retrieving contact information for the list of participants;
   establishing the conference call for later joining by one or more of the list of participants;
   determining whether for each participant from the list of participants, an application for the participant supports a conference module;
   responsive to the application supporting the conference module, allowing only the participant whose application supports the conference call to automatically join the conference call; and
   responsive to the determination that the conference module is unsupported, generating a notification of conference details to the participant.

28. The method of claim 1, wherein the first application and the second application are a same type of application.

* * * * *